United States Patent
Öhrström et al.

(10) Patent No.: US 7,031,693 B2
(45) Date of Patent: Apr. 18, 2006

(54) METHOD AND SYSTEM FOR REFILLING MOBILE TELEPHONE PREPAID PHONE CARDS VIA ELECTRONIC DISTRIBUTION OF REFILL CODES

(75) Inventors: Fredrik Öhrström, Stockholm (SE); Kent Närling, Årsta (SE); Martin Wingert, Hägersten (SE); Peter Edsbäcker, Grödinge (SE); Mikael Signarsson, Sollentuna (SE)

(73) Assignee: Seamless Distribution AB, Stockholm (SE)

( * ) Notice: Subject to any disclaimer, the term of this patent is extended or adjusted under 35 U.S.C. 154(b) by 167 days.

(21) Appl. No.: 10/244,080

(22) Filed: Sep. 13, 2002

(65) Prior Publication Data

US 2003/0050043 A1    Mar. 13, 2003

Related U.S. Application Data

(60) Provisional application No. 60/318,777, filed on Sep. 13, 2001, provisional application No. 60/338,691, filed on Nov. 6, 2001.

(51) Int. Cl.
*H04M 11/00* (2006.01)
*H04M 15/00* (2006.01)

(52) U.S. Cl. .................. 455/406; 455/408; 379/114.16; 379/114.2

(58) Field of Classification Search ................ 455/406, 455/408, 410, 414; 379/114.15, 114.16, 379/114.18, 114.2, 115.01, 144.01, 144.05; 705/40, 41

See application file for complete search history.

(56) References Cited

U.S. PATENT DOCUMENTS

| 5,109,401 | A |   | 4/1992  | Hattori et al. ............... 379/58 |
|-----------|---|---|---------|---------------------------------------|
| 5,138,650 | A |   | 8/1992  | Stahl et al. .................... 379/61 |
| 5,359,182 | A |   | 10/1994 | Schilling .................... 235/380 |
| 5,376,931 | A |   | 12/1994 | Marrs .................... 340/825.44 |
| 5,577,100 | A |   | 11/1996 | McGregor et al. ............ 379/58 |
| 5,577,109 | A | * | 11/1996 | Stimson et al. .......... 379/114.2 |
| 5,631,947 | A |   | 5/1997  | Wittstein et al. .............. 379/59 |

(Continued)

FOREIGN PATENT DOCUMENTS

EP    111676 A2    6/1984

(Continued)

OTHER PUBLICATIONS www.kioskcom.com/article_detail.php?ident=676, Your source for self-service kiosk Information, 2 pages (Oct. 2, 2001).

(Continued)

*Primary Examiner*—Binh K. Tieu
(74) *Attorney, Agent, or Firm*—Darby & Darby

(57) ABSTRACT

Method and system for refilling mobile terminal prepaid phone cards via electronic distribution of refill codes. Refill codes for prepaid phone cards are distributed to end users via a prepaid phone card distributor, which contracts with mobile phone operators and prepaid phone card retailers to distribute refill codes. End users enter identification and payment information to the refill code distributor, which then records the payment and returns a refill code to the end users. End users can purchase refill codes by mediums including a computer network and refill terminals located at retail shops.

21 Claims, 5 Drawing Sheets

U.S. PATENT DOCUMENTS

| | | | |
|---|---|---|---|
| 5,719,926 A | 2/1998 | Hill | 379/113 |
| 5,740,247 A | 4/1998 | Violante et al. | 380/24 |
| 5,765,106 A | 6/1998 | Violante et al. | 455/410 |
| 5,812,945 A | 9/1998 | Hansen et al. | 455/403 |
| 5,825,863 A | 10/1998 | Walker | 379/144 |
| 5,881,133 A | 3/1999 | Ryan, Jr. et al. | 379/67.1 |
| 5,903,633 A | 5/1999 | Lorsch | 379/114 |
| 5,974,307 A | 10/1999 | Kovlakas et al. | 455/405 |
| 5,983,091 A | 11/1999 | Rodriguez | 455/405 |
| 5,991,413 A * | 11/1999 | Arditti et al. | 705/77 |
| 6,029,062 A | 2/2000 | Hanson | 455/408 |
| 6,036,090 A | 3/2000 | Rahman et al. | 235/380 |
| 6,058,300 A | 5/2000 | Hanson | 455/406 |
| 6,115,601 A | 9/2000 | Ferreira | 455/406 |
| 6,141,666 A | 10/2000 | Tobin | 707/513 |
| 6,169,975 B1 | 1/2001 | White et al. | 705/44 |
| 6,188,752 B1 | 2/2001 | Lesley | 379/114 |
| 6,198,915 B1 | 3/2001 | McGregor et al. | 455/406 |
| 6,208,851 B1 | 3/2001 | Hanson | 455/405 |
| 6,236,851 B1 | 5/2001 | Fougnies et al. | 455/408 |
| 6,320,947 B1 * | 11/2001 | Joyce et al. | 379/114.2 |
| 6,526,130 B1 * | 2/2003 | Paschini | 379/93.12 |
| 6,526,273 B1 * | 2/2003 | Link et al. | 455/406 |
| 6,628,766 B1 * | 9/2003 | Hollis et al. | 379/114.2 |
| 2001/0000777 A1 | 5/2001 | McGregor et al. | 455/406 |
| 2001/0007991 A1 | 7/2001 | Tobin | 709/203 |
| 2001/0009849 A1 | 7/2001 | Hanson | 455/408 |
| 2001/0021648 A1 | 9/2001 | Fougnies et al. | 455/408 |
| 2001/0023180 A1 | 9/2001 | Sauer | 455/406 |
| 2001/0028705 A1 | 10/2001 | Adams et al. | 379/114.2 |
| 2002/0031241 A1 | 3/2002 | Kawaguchi et al. | 382/100 |
| 2003/0008634 A1 * | 1/2003 | Laybourn et al. | 455/407 |
| 2004/0009760 A1 * | 1/2004 | Laybourn et al. | 455/405 |

FOREIGN PATENT DOCUMENTS

| | | |
|---|---|---|
| EP | 0 976 081 | 9/2001 |
| JP | 2000-087454 | 3/2000 |
| JP | 2001005812 A | 1/2001 |
| JP | 2001-274980 | 10/2001 |
| WO | WO 98/34168 | 8/1998 |
| WO | WO 00/19365 | 4/2000 |
| WO | WO 01/48716 | 7/2001 |
| WO | WO 01/60044 | 8/2001 |

OTHER PUBLICATIONS www.access-us-inc.com/news/press_releases/2001-10-01_newmgmt.html, News/In The Press, 2 pages (Apr. 10, 2002).

* cited by examiner

METHOD AND SYSTEM FOR REFILLING MOBILE TELEPHONE PREPAID PHONE CARDS VIA ELECTRONIC DISTRIBUTION OF REFILL CODES

CROSS-REFERENCE TO RELATED APPLICATIONS

This application claims the benefit of priority from both provisional U.S. Patent Application Ser. No. 60/318,777, entitled METHOD AND SYSTEM FOR REFILLING MOBILE TELEPHONE PREPAID PHONE CARDS VIA ELECTRONIC DISTRIBUTION OF REFILL CODES, filed Sep. 13, 2001 and provisional U.S. Patent Application Ser. No. 60/338,691, entitled METHOD AND SYSTEM FOR REFILLING MOBILE TELEPHONE PREPAID PHONE CARDS VIA ELECTRONIC DISTRIBUTION OF REFILL CODES, filed Nov. 6, 2001.

FIELD OF THE INVENTION

The present invention generally relates to mobile phones and prepaid phone cards. More specifically, this invention relates to a method and system for effecting delivery with the aide of a computer network of a refill code by a distributor of refill codes to an end user of prepaid telecommunication services.

BACKGROUND OF THE INVENTION

The innovation of prepaid phone cards for mobile phones has allowed previously impermissible patterns of mobile phone use. Prepaid phone cards allow mobile phone customers to exchange cash for mobile phone time, thereby permitting a number of previously unavailable mobile phone usage patterns. For instance, customers who are considered a credit risk (such as international travelers or individuals with a poor credit history) and would otherwise be denied mobile phone service by a mobile phone operator are able to secure service from a mobile phone operator by paying for the usage time in advance. Similarly, classes of individuals such as children may have their mobile phone time limited through prepaid phone card time limits that set ceilings on mobile phone use and spending. Thus, mobile phone operators benefit by securing additional customers that would otherwise be rejected as a credit risk, and customers themselves also benefit because they are able to set limits on their calling time and calling costs.

In order to utilize prepaid phone cards for mobile phones, customers must periodically "refill" their prepaid phone cards to keep their available time from expiring. Customers may refill their prepaid phone cards by entering a refill code, which adds additional time to their prepaid phone card and thereby raises the usage limit for the mobile phone. Refill codes are traditionally purchased from retailers or operators who sell refill codes to customers. A number of significant problems exist with these prior art methods for the purchase of refill codes by customers from operators and retailers.

First, retailers and operators typically sell refill codes in "hard copy" or paper forms, wherein the customer provides payment in exchange for a preprinted refill code. Such a refill code is equivalent to its cash value, however, and thus susceptible to theft from operators and retailers in their hard copy form. Thus, one significant problem is the theft of refill codes from retailers and operators in order to resell stolen refill codes to customers. This problem is difficult to avoid, because retailers and operators are forced to carry an inventory of hard copy refill codes to sell to customers for use in the traditional customer refill code purchase methods.

Second, in exchange for a reduced customer credit risk, operators must endure a loss of customer control and marketing power that stems from the customers' ability to utilize any mobile phone operator to refill their phone card. In other words, customers are free to pick and choose any mobile phone operator whenever they refill their prepaid phone card by purchasing a refill code from any available operator, provided that the customer has purchased the necessary starter kits from each operator. These starter kits are of low cost and have little effect on customer loyalty. The original operator may never know which operator a former customer has switched to or the reason for the switch. Thus, unlike mobile phone customers that do not use prepaid phone cards and thereby remain tied to a particular operator, those mobile phone customers that do use prepaid phone cards are free to change operators every time they refill their prepaid phone cards. This is undesirable for operators, who at a minimum seek to track the usage patterns of mobile phone customers, and usually seek to retain their current customers while attracting new customers.

Third, customers themselves lose the benefits of simplicity and convenience due to the cumbersome process associated with refilling a mobile phone card using traditional methods. Each time their prepaid phone card must be refilled, the customer must seek out a retailer or operator and purchase a hard copy of a mobile terminal refill code. The refill code may have been fraudulently obtained or stolen and then resold, however, and may thus be useless to the mobile customer. The customer also has no convenient way to receive the potential benefits from a single operator that would otherwise be granted to a new or long-term customer, such as rebates and special discounts. This is so because the operators cannot track which customers purchase their refill codes, and thus cannot provide specific, customer-based incentives and benefits for customers to purchase their refill codes. Thus, customers are also deprived of financial benefits because of traditional methods of purchasing refill codes.

These and other deficiencies in the traditional methods for purchasing, tracking and distributing the refill codes for prepaid phone cards for mobile phones are addressed by the present invention.

SUMMARY OF THE INVENTION

A first embodiment of the present invention involves a method for effecting delivery of a refill code by a distributor of refill codes to an end user of prepaid telecommunications services associated with a provider of the services. The method includes the steps of displaying, receiving, obtaining, and delivering. The displaying step comprises displaying refill code information at a station linked to a computer network and having a visual display. The method effects the display of the refill code information to the end user on a web site of a distributor preferably emulating a web site of a retailer of refill codes. The receiving step comprises receiving a refill code request from the end user at the station. The obtaining step comprises obtaining a refill code corresponding to the refill code request. The delivering step comprises delivering the refill code to the end user.

A second embodiment of the present invention involves a system for effecting delivery of a refill code by a distributor of refill codes for resale to an end user of prepaid telecommunications services associated with a provider of the services as authorized by prescribed authorization indicia.

The system includes the components of a refill code inventory, an interface, a processor, and a means for replenishing an end user's prepaid telecommunications account. The refill code inventory contains available refill codes. Refill code types occupy the interface, each refill code in inventory having been assigned a corresponding refill code type and having been associated with a provider. The processor receives a refill code type request and obtains an available refill code of the requested type from the inventory and upon delivery designates the obtained refill code as an unavailable refill code. The means delivers the refill code upon verification of the prescribed authorization indicia.

A third embodiment of the present invention replaces the means for delivering of the second embodiment with a means for replenishing. The means in the third embodiment replenishes an end user's prepaid telecommunications services account with the obtained refill code upon verification of an end user identity.

A fourth embodiment of the present invention involves a method for effecting delivery through a computer network of a refill code by a distributor of refill codes to an end user of prepaid telecommunications services associated with a provider of said services. The fourth embodiment comprises the steps of obtaining, displaying, receiving, and delivering. The obtaining step comprises obtaining a refill code from an inventory of refill codes. The displaying step comprises displaying an available refill code type to an end user on a web site. The receiving step comprises receiving a refill code request from said end user. The delivering step comprises delivering said refill code to said end user across said computer network.

Other objects and features of the present invention will become apparent from the following detailed description considered in conjunction with the accompanying drawings. It is to be understood, however, that the drawings are designed solely for the purpose of illustration and not as a definition of the invention.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

Figure 1:
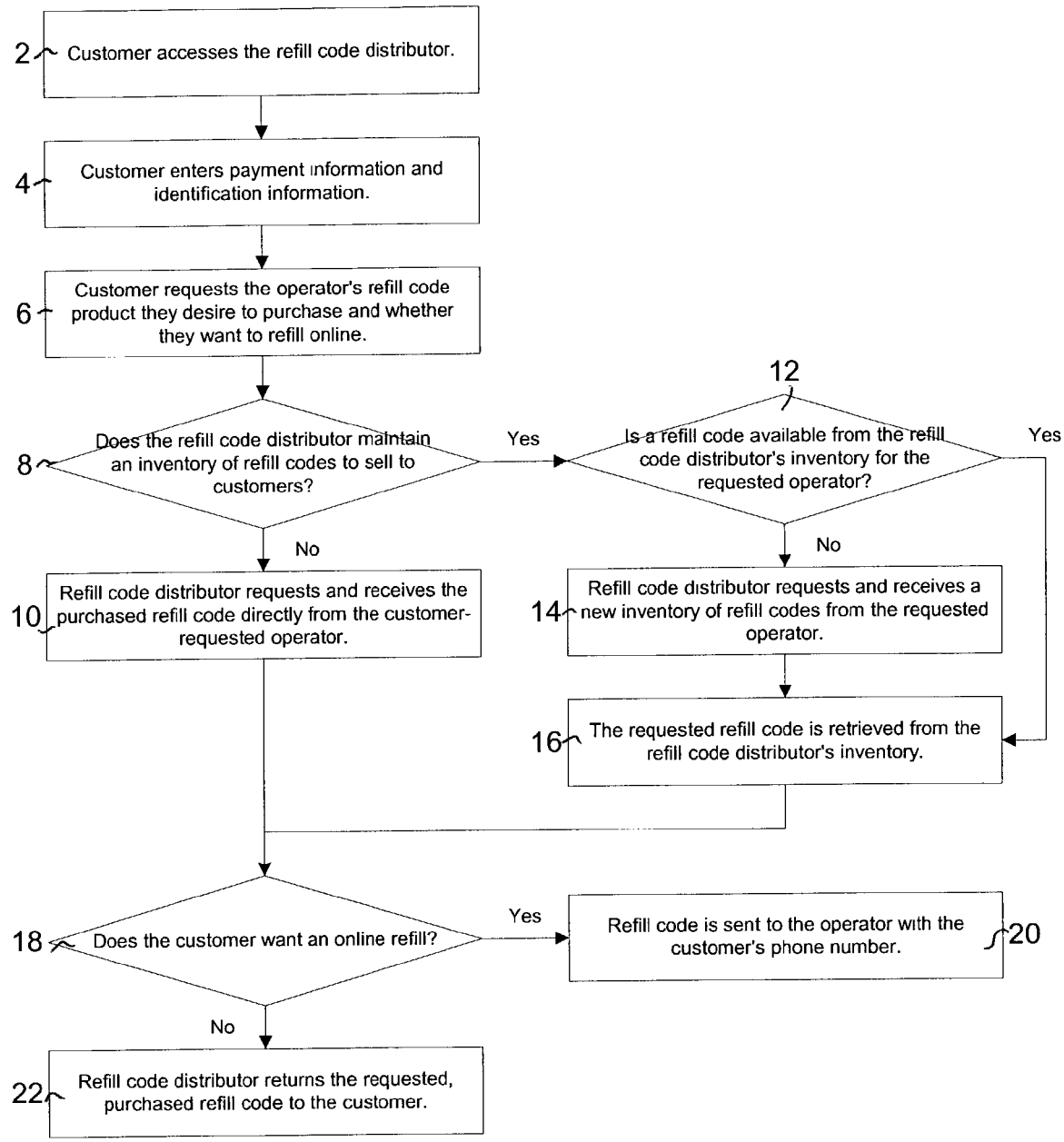
FIG. 1 is a flowchart of an exemplary refill code electronic distribution process in accordance with the present invention.

DETAILED DESCRIPTION OF THE PREFERRED EMBODIMENTS:

By way of overview and introduction, the present invention is directed to a method and system that employ a computer network such as the Internet and remote terminals as mediums through which refill codes for prepaid phone cards can be purchased by and distributed to customers. The present invention also entails a number of incentives for customers, retailers and operators that benefit these parties when purchasing and distributing refill codes using the present invention. Finally, the present invention avoids a number of prominent problems associated with the traditional, hard copy methods for purchasing and distributing refill codes such as theft, thereby providing further benefit to customers, retailers and operators.

The method of the present invention includes the distribution of refill codes electronically via a refill code distributor. The refill code distributor may contract with one or more retailers and/or operators of prepaid telecommunication services to secure an electronic inventory of refill codes that can be distributed to customers. Customers, also known as end users, then purchase the refill codes directly from the distributor rather than from a retailer or an operator. The distributor can hold an electronic inventory of refill codes in its immediate possession, or can electronically retrieve its inventory of refill codes from a third party (e.g. the operator) upon purchase by the end user. Electronic security measures including encryption and distributor pass codes or the like guarantee that the refill codes cannot be stolen. Moreover, there is no opportunity to steal hard copies of refill codes because no inventory of such copies exist (and in fact, no hard copies whatsoever need be generated).

For the purposes of the present invention, a "customer" or "end user" may include a purchaser or customer of refill codes for their own use, and the purchase of a refill code adds time for the end user to use their own phone. A "retailer" can include a point of sale entity where the end user may go to purchase a refill code. A retailer may deliver the code through a terminal owned by the retailer, or the retailer may simply link the end user to the "distributor," in which case the retailer in effect rents a site to the distributor. In this case, the end user takes on some attributes of the retailer. The retailer can link to the distributor or simulate the distributor's site via the retailer's site if the retailer links the distributor through the Internet. The distributor can also simulate the operator's site, so that the end user thinks he/she is purchasing from a particular operator. A "distributor" may include a system administrator and/or wholesaler of refill codes, and may also act to link retailers with end users. An "operator" is a creator of refill codes, and may be a cellular or other mobile telephony provider. An operator is also known as a provider of telecommunication services. Refill codes could also be created by a random number generator. A "user" may include an individual authorized to carry out a sale of refill codes to an end user (such authorization evidenced by prescribed authorization indicia such as an electronically readable card), an employee of the retailer, such as a cashier, or an administrator or distributor, each of whom have different privileges related to the purchase of refill codes and access to the system of their distribution. A "purchase" is a transaction by a retailer from a distributor wherein the retailer downloads a refill code from a distributor and preferably obligates itself to pay for it at download; thus, the retailer bears the subsequent risk of loss for stolen refill codes that are not resold. However, the retailer need not keep an inventory so the retailer can use the distributor as an inventory manager. "Delivery" is transmission of a refill code by a retailer or a distributor to an end user when the end user purchases a refill code. "Distribution" is transmission of a refill code by a distributor to one or more retailers and reporting such transmission by the distributor's administrator.

One embodiment of the present invention provides for the distribution of refill codes using the Internet as a distribution medium. In this implementation, an end user purchases a refill code by making payment and receiving a refill code through an Internet distributor, and more specifically, the Internet distributor's server system and web site. The Internet distributor contracts with a plurality of retailers and/or operators to act as an online distributor (who may or may not be affiliated with the mobile operator) for the refill codes of those retailers and/or operators. When a mobile phone end user seeks to refill their prepaid phone card by visiting a retailer or operator's web site, that retailer or operator may direct the end user to the Internet distributor's web site. Whether directed to another site or not, the end user then refills the prepaid phone card directly from the Internet distributor (or from the retailer) by entering identification and payment information, such as one or more of the mobile phone number, prepaid phone card number, PIN, credit card information, delivery information, or billing information. The refill code is retrieved by the distributor's server system and returned to the end user (or can be sent to the operator along with the end user's mobile phone number, so that the number can be "credited" with the purchased refill). By contracting with a plurality of retailers and/or operators, the Internet distributor can maintain a plurality of refill web pages for those retailers and operators with whom the distributor has contracted. Thus, the distributor in fact distributes a plurality of refill codes for different retailers and/or operators, and the end user obtains a refill code associated with a particular operator by being directed to the distributor's corresponding web site for the operator.

When refilling their prepaid phone card from an Internet distributor, the end user will preferably access one of a plurality of refill web pages that are tailored for the different Internet retailers that refer the end user to the distributor. Such a refill web page includes the retailer's name, logo, or other retailer identification information, as well as refill help information for the end users accessing the refill web site. The site will typically display a choice of refill types for one or more operators. The refill code information displayed to the user includes refill code type (a.k.a. operator choice and/or refill amount) and payment method. In response to the displayed refill code information the user enters a refill code request which may include desired refill code type, billing information, and delivery information. As an alternative, as mentioned above, the distributor's website can simulate an operator's web page, so that the end user thinks he/she is purchasing directly from the operator.

Another implementation of the present invention provides for the distribution of refill codes using refill terminals located at retailer shops. In this implementation, an end user purchases a refill code by making a payment at a refill terminal or paying a cashier who is operating such a terminal. The terminal is then able to refill the end user's prepaid mobile card by returning a refill code to the end user. The end user may enter identification and payment information such as one or more of their mobile phone number, prepaid phone card number, PIN, cash, credit card information, delivery information or billing information. This information may also be included on a magnetic or electronic medium, such as a credit card, for convenience and security. The refill terminal accepts this information, as well as the selection of the desired refill code product, and then returns a refill code to the end user. Preferably, the refill terminal owner is able to secure the refill terminal via a security key to prevent unauthorized use of the refill terminal. In addition, and preferably, the functionality of the refill terminal itself may be loaded into already existing terminals such as those for credit card payment, thereby eliminating the need for a separate or dedicated refill terminal. Once again, the refill code distributor is able to contract with a plurality of operators and retailers and to provide the latter with a refill terminal and thus is able to provide a selection of refill code products to the end users. (Nothing in this description prevents an operator from acting as a retailer as well. In that event, the distributor may retain the administrative functions for distribution of the product.)

When refilling a prepaid phone card using an Internet distributor, refill terminal, or other means for the electronic distribution for refill codes, the prepaid phone card may be refilled via a plurality of secure methods. First, the end user may simply receive a refill code via display or printed form, which the end user then manually enters to complete the refill process via traditional methods. Second, the refill code may be sent to the end user directly via methods including standard mail and e-mail, visual display, physical display on a printed medium or other direct methods. Third, the end user's prepaid phone card may be refilled directly via communication from the distributor to the retailer or operator, thereby eliminating altogether the end user's need to receive a refill code. Any of these distribution methods eliminate the need to keep hard copy inventories of refill codes on hand to distribute to end users, thus preventing the theft of refill codes. Also, these and other means of electronic distribution provide secure electronic encryption and security measures to protect the transmission and distribution of refill codes.

Under the present invention, there are significant financial and non-financial incentives and benefits for distributors, retailers and operators. Distributors receive profits by keeping a percentage of the margin at which each refill code is sold, and are able to specify this marginal percentage according to the different distributor contracts with retailers and/or operators. By contracting with a plurality of retailers and operators, distributors are able to reduce their percentage of the margin in exchange for larger end user volume, thereby making their services attractive and cost-effective to retailers and operators. In addition, distributors merely distribute the refill codes, and are thereby not competing with retailers and operators by providing an independent product. Therefore, retailers and operators do not view distributors as competitors and are not reluctant to contract with distributors. Furthermore, no marketing costs are incurred by the distributors; instead, all marketing costs are absorbed by the operators and retailers which direct end users to the distributor, thereby lowering the operating cost of distributors.

The retailers and operators also benefit by retaining a percentage of the margin at which the refill codes are sold by the distributor. In addition, the retailers and operators are only responsible for directing the end users to the distributors, but do not incur any of the distribution costs that fall on the distributor. Thus, retailers and operators are only responsible for any marketing costs incurred when directing end users to the distributors. As mentioned above, the services of operators will be viewed as cost-effective given the relatively low marginal percentage kept by the distributor. Furthermore, operators and retailers are able to track usage and refill information about specific end users and demographic groups as they refill their phone cards through the distributor. This market information is highly valuable and further enhances the appeal of distributors. By tracking usage and refill code information of end users compiled by distributors, retailers and operators are able to offer special promotions and rebates to attract new end users, maintain present end users, and adjust their marketing approaches. The distributor is also able to quickly and automatically provide an invoice list to the operators and retailers based on end user purchases. Finally, theft of refill codes is virtually eliminated due to electronic encryption and security measures, as well as the general unavailability of opportunity due to the loss of refill code hard copies.

Within each mode of electronic refill code distribution, there are the following preferred features which can be implemented individually or in any combination:

(a) If through the web:

E-mail confirmation of code delivery, which prevents code loss if a computer freezes at the moment of code delivery but after payment has been made.

Online refill option, wherein instead of delivering a verification code to be keyed into a mobile phone by an end user, the end user pays for the refill, sends his or her phone number to the distributor, the distributor transmits the phone number and the purchased refill code to the operator, the operator removes the code from those available codes and "credits" the phone number with an appropriate phone time allotment, and a message is delivered to the end user confirming the grant of newly purchased time.

Credit risk analysis of an end user by a retailer or distributor.

Creating (or precluding) a record of transactions according to the end user's preference.

Generating a retailer invoice and submitting this invoice to the distributor.

Alternative delivery methods of purchased code including Short Message System (SMS), e-mail, fax, on-screen terminal display, printing, etc.

Simulation of appearance of web pages of various operators (or retailers).

(b) If through a terminal:

Buffering the delivered product, wherein refill codes are downloaded to the terminal (and become the risk of the retailer as the retailer is invoiced upon transmission of refill codes to the buffer) and instantly available for delivery to the end user upon purchase.

Downloading system updates, product availability, textual instructions (including how to use delivered codes), settings, and optionally assuming direct control of terminals via automatic and/or manual commands.

User definition options, wherein retailers can add, remove and change prescribed authorization indicia (e.g., appoint newly authorized supervisors and cashiers).

Online refill option, similar to the one on the internet, by providing a phone number and payment information which combination is known to the distributor only, not the operator. The phone number is transmitted to the distributor.

Printed refill codes similar to credit card receipts.

Retailer control and generation of invoices.

Use of existing, multifunction and dedicated terminals.

Use of prescribed authorization indicia, a user code, user card, or both for the retailer's personnel (e.g., cashier).

Both methods make it possible to pay at each step, if desired, thereby eliminating complex accounting and reconciliation communications. For example, the distributor can pay the operator for a batch of refill codes, which then become part of the distributor's inventory; the distributor then can get paid upon sending the refill code to the retailer, and the retailer gets paid by the end user.

FIG. 1 shows a flowchart of an exemplary refill code distribution process in accordance with the present invention, wherein a refill code is electronically purchased and distributed to an end user from a refill code distributor. The refill code distributor in turn secures an electronic inventory of refill codes from operators, and it is from this inventory of refill codes that an end user receives their refill code.

Referring now to FIG. 1, the end user first accesses the refill code distributor (step 2). This may occur by direct access of the end user to the refill code distributor, or via referral or redirection by an operator or retailer to the refill code distributor. The end user then enters the end user identification and payment information necessary to purchase a refill code from the distributor (step 4). This identification and payment information may include the end user's mobile phone number, prepaid phone card number, PIN, credit card information, delivery information, or billing information. This information may be either manually entered by the end user, or automatically entered by means such as a credit card or other electronic or magnetic storage media that is read by the refill code distributor. The end user then specifies the operator's refill code product they desire to purchase, as well as whether the end user wants the refill to occur online (step 6). With online refill, the refill code distributor returns the refill code to the operator. This specification may be manually input by the end user, or may be automatic based on the operator that referred the end user to the refill code distributor. A refill code product is simply the type of refill code the end user wishes to purchase.

After receiving the end user's identification, payment and purchase information, the refill code distributor then obtains a refill code to deliver to the end user. This occurs based on first whether the refill code distributor has an inventory of refill codes (step 8) and based on second whether the refill code distributor has in its inventory the particular refill code requested (step 12) or whether the refill code distributor receives the requested refill code from an operator (step 10). If the requested refill code is not kept by the refill code distributor, then the process proceeds to step 10, and the refill code is requested and retrieved from the operator specified by the end user. If a refill code inventory is kept by the refill code distributor, then the process proceeds to step 12.

At step 12, it is determined whether the requested refill code is available from the distributor's inventory. If the refill code is retrieved from the refill code distributor's inventory, then the process proceeds to step 16, and the requested refill code is retrieved from the refill code distributor's inventory. If not, then the process proceeds to step 14. At step 14, the refill code distributor's inventory does not include the requested refill code for the requested operator or retailer, so the refill code distributor requests and obtains a new inventory of refill codes from the specified operator or retailer that includes the specified refill code. Upon obtaining the refill code, the refill code distributor encrypts said refill code and stores said encrypted refill code in a manner that permits its retrieval according to refill code type. The process then proceeds to step 16, wherein the requested refill code is now retrieved from the inventory of the refill code distributor, which now includes an appropriate refill code.

The process proceeds to step 18, wherein it is determined if the end user wanted online refill based on their selection at step 6. If the end user did want online refill, then the process proceeds to step 20, and the refill code is sent to the operator with the end user's phone number so the operator can refill the end user's prepaid card. If the end user did not want online refill, then the process proceeds to step 22, and the refill code is sent to the end user so the end user can refill his prepaid calling card with the refill code. Thus, the end user receives the requested refill code, thereby completing the purchase of the requested refill code by the end user.

Figure 2:
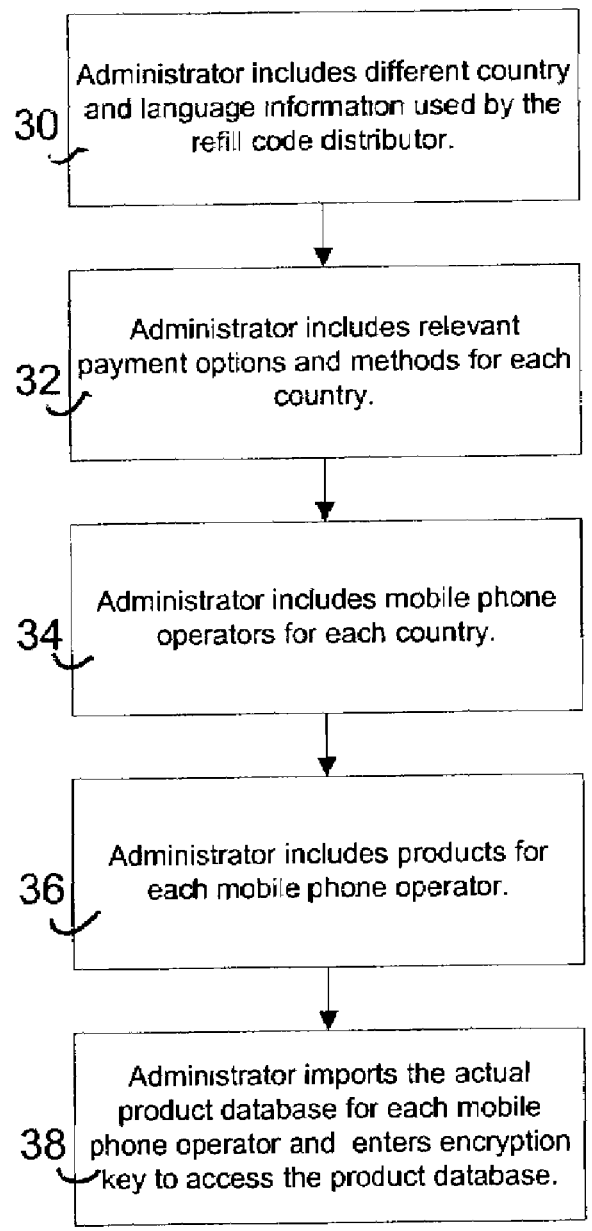
FIG. 2 is a flowchart of an exemplary refill code administration process in accordance with the present invention.

FIG. 2 shows a flowchart of an exemplary refill code administration process in accordance with the present invention, wherein the general administration framework for refill code distributors is created by an administrator who sets up a refill code distributor. This administration process applies both to the general method of the present invention, as well as to the Internet distributor and refill terminal implementations of the present invention.

Referring now to FIG. 2, the administrator first includes general information, such as the locale and language information that will be used by the refill code distributor (step 30). Such locale and language information may be used to determine the taxes that will be applied to the refill purchase, the currency with which the purchase will occur, and the language that will be displayed to an end user from a particular country. The administrator then includes the relevant payment options and methods for each locale (step 32). The administrator next includes the participating refill code operators (e.g., Comviq, Europolitan, Telia, Vodaphone, Verizon, AT&T Wireless), for each locale (step 34). For each retailer, refill codes for all or a subset of participating operators may be made available for delivery to end users. It is also possible to add or remove different operators and retailers. The administrator then includes the products for each operator, which includes the different refill codes products available for purchase from the operator (step 36). Product information included by the administrator includes the refill code product name and price information, as well as any necessary updates for this information based on changes made by the retailers. Finally, the administrator includes the specific product inventory, which is preferably encrypted and requires the administrator to enter a password to allow access to the product database (step 38). The locking mechanism itself is a security measure to prevent unauthorized access of purchase products in the event that the hardware (e.g., servers) that include a product database are stolen. The product database includes the product information entered by the administrator including name and pricing information. At this point, the general administration framework for the refill code distributor is established by the administrator.

Figure 3:
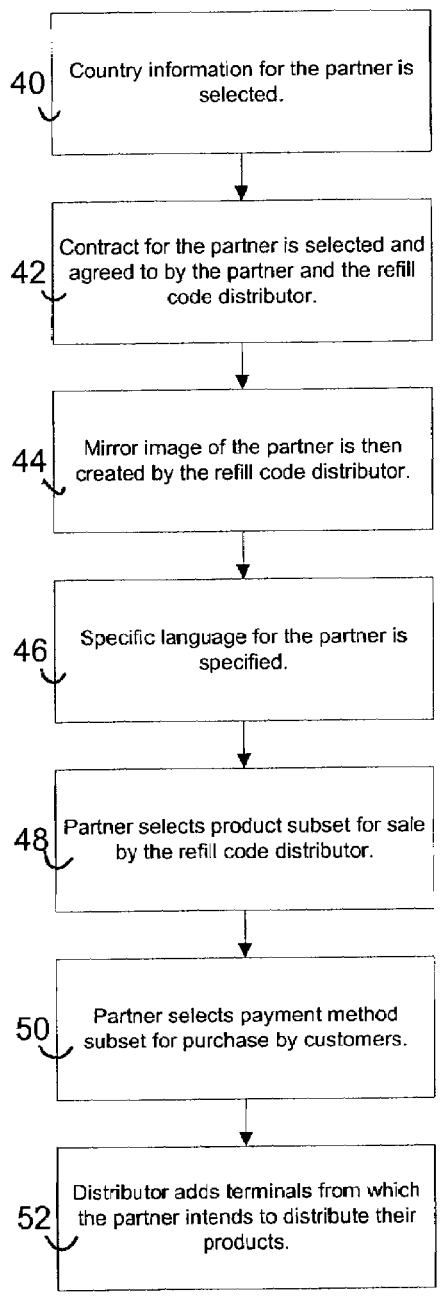
FIG. 3 is a flowchart of an exemplary refill code partner creation process in accordance with the present invention.

FIG. 3 shows a flowchart of an exemplary refill code partner creation process in accordance with the present invention, wherein a retailer or operator that contracts with a refill code distributor to refer end users to the distributor is referred to as a "partner." The partner earns a profit for each refill code sold based on the subsequent purchase of a refill code from the distributor to whom the partner referred to the distributor.

Referring now to FIG. 3, the locale information of the refill code partner (operator or retailer) is first specified. The locale information for a partner may include the state or country in which the partner does business and thus information such as tax rates, tariffs, etc. pertinent to that partner (step 40). The contract for the partner is then selected and agreed to by the partner and the refill code distributor (step 42). The contract specifies terms such as: commission percentages for different operators, types of operator products, partners, sales, and margins.

A mirror image of the partner is then created by the refill code distributor at the refill code distributor (step 44). This mirror image emulates the appearance of the partner, and thus conveys the impression to end users that the end user is purchasing the refill code from the partner rather than from the distributor. For Internet implementations, this mirror image includes a mirror web site that appears similar to the web site of the partner. For refill terminal implementations, this mirror image represents either the appearance of a partner's terminal or the general appearance of the terminal as desired and specified by the partner. One or more languages for each partner are then specified (step 46).

The partner is then able to select a specific subset of products to sell (step 48). Such a selection is often desirable, particularly when the partner is itself the operator, and thus desires to promote and sell its own products. The partner next selects one or more payment methods for the partner's products (step 50). The partner may desire to limit payment methods in order to maintain end user loyalty through partner-specific payment methods that the end user can only use to purchase the partner's products. For instance, the partner could allow payment only through bonus-credits, wherein an end user is credited with partial payment in exchange for prior use of the partner's products or being a first-time end user for the partner's products.

The distributor then adds terminals that the partner intends to use to distribute their products (step 52). The partner may also include a locking mechanism as a security precaution, which requires the partner to unlock its product database to enable the purchase of products by end users via electronic methods including Internet distribution and refill terminals.

Figure 4:
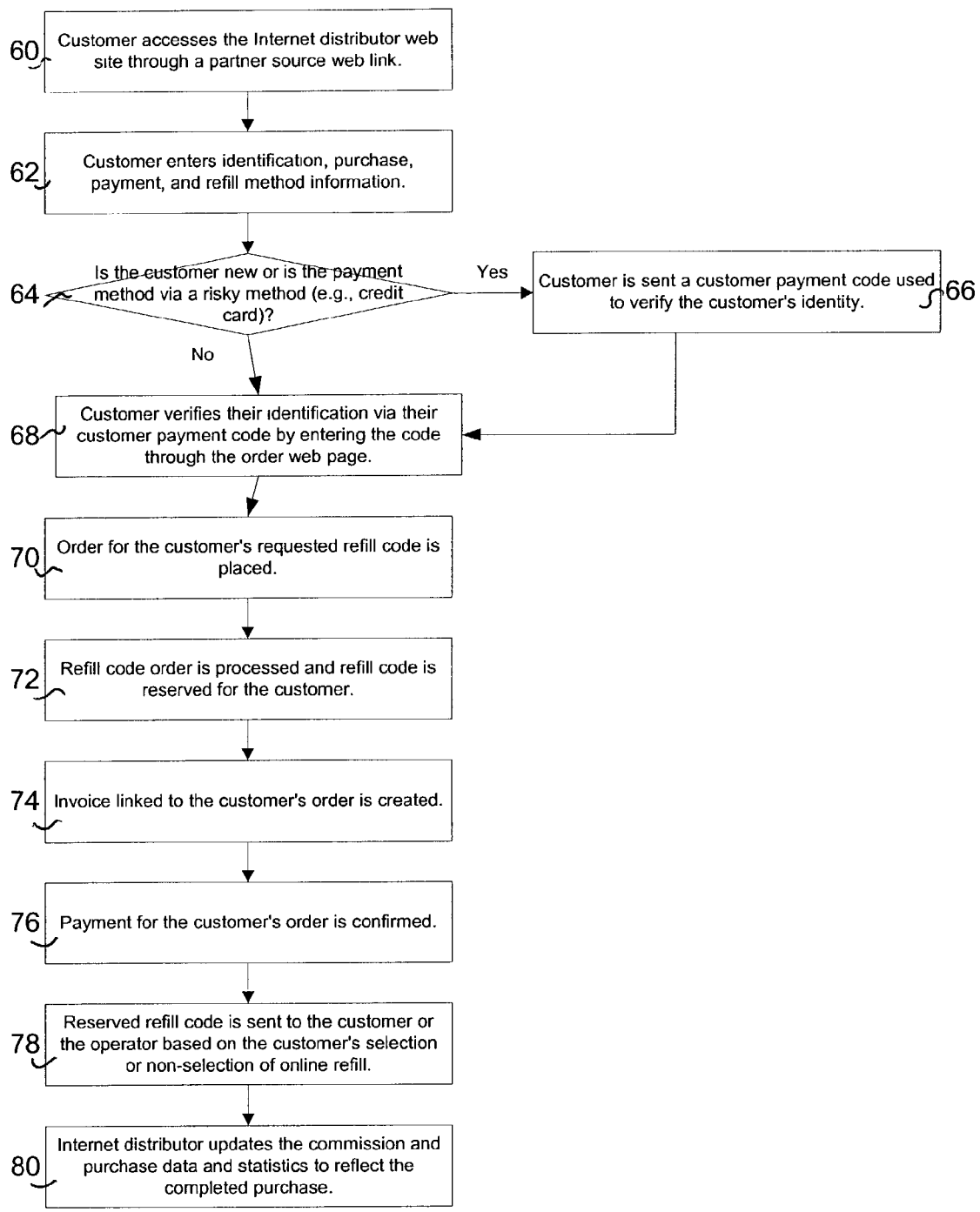
FIG. 4 is a flowchart of an exemplary refill code internet purchase process in accordance with the present invention.

FIG. 4 shows a flowchart of an exemplary refill code internet purchase process in accordance with the present invention, wherein an end user purchases a refill code from a partner through an Internet distributor. As discussed above, this process occurs via a mirror web site for the partner located at the Internet distributor.

Referring now to FIG. 4, first the end user accesses the Internet distributor web site through a partner's source web link (step 60). The partner's source web link essentially specifies the partner that referred the end user to the Internet distributor, and thus specifies information including which mirror image/mirror web site should be displayed to the end user and the partner contract that applies to the end user purchase. The end user then enters their end user identification, purchase and payment information. This information may include their e-mail address, method of payment, desired operator, desired product, desired refill method (online or verification code) and purchase acceptance confirmation (step 62). The Internet distributor then determines if the end user is risky (step 64). Such a determination can be made by numerous methods including examination of the end user's e-mail address or payment information, whether the end user is a new customer, or whether the end user wants to pay with a payment method that is highly susceptible to fraud, such as a credit card.

If the end user is risky, then the process proceeds to step 66, wherein the end user is sent a verification code that the end user must enter to verify their identification before a purchase can be completed. This end user verification code may be sent to the end user by means including regular mail or e-mail. The process then proceeds to step 68. If the end user is not risky, then the process proceeds directly to step 68.

At step 68, the end user verifies their identification by entering their verification code. The process then proceeds to step 70, wherein an order for the end user's requested refill code is placed. This order is processed by reserving the requested refill code, (step 72), and creating an internal electronic invoice linked to the end user's order (step 74). Payment for the order is then confirmed by the Internet distributor either synchronously or a synchronously. Synchronous refers to an automatic confirmation of payment. With synchronous confirmation, the Internet Distributor's system queries the bank or financial institution providing the funds for payment for the available funds and waits until the funds are received from the payment institution. With asynchronous confirmation, the end user arranges payment with the bank offline, and then sends a proof of payment. (step 76). This process can preferably be automated by having the Internet Distributor's system (e.g. server) automatically provide the end user's system (e.g. browser) with the information necessary for completing the payment and redirecting the end user's system to the payment institution's system for completion of the payment procedure. Once the end user has obtained a valid proof of payment from the payment institution's system he can provide that to the Internet Distributor's system for confirmation. If the end user does not return with such a proof by a predetermined time period (e.g. one hour), the reservation is dropped. If the end user selected online refill, then the refill code in association with the end user's telephone number is sent directly to the operator, thereby completing direct refill of the end user's prepaid calling card; otherwise, the reserved refill code is then released to the end user and received by the end user in one or more forms including display, print, and e-mail (step 78). The Internet distributor finally updates the commission and purchase data and statistics to reflect the completed purchase (step 80).

Figure 5:
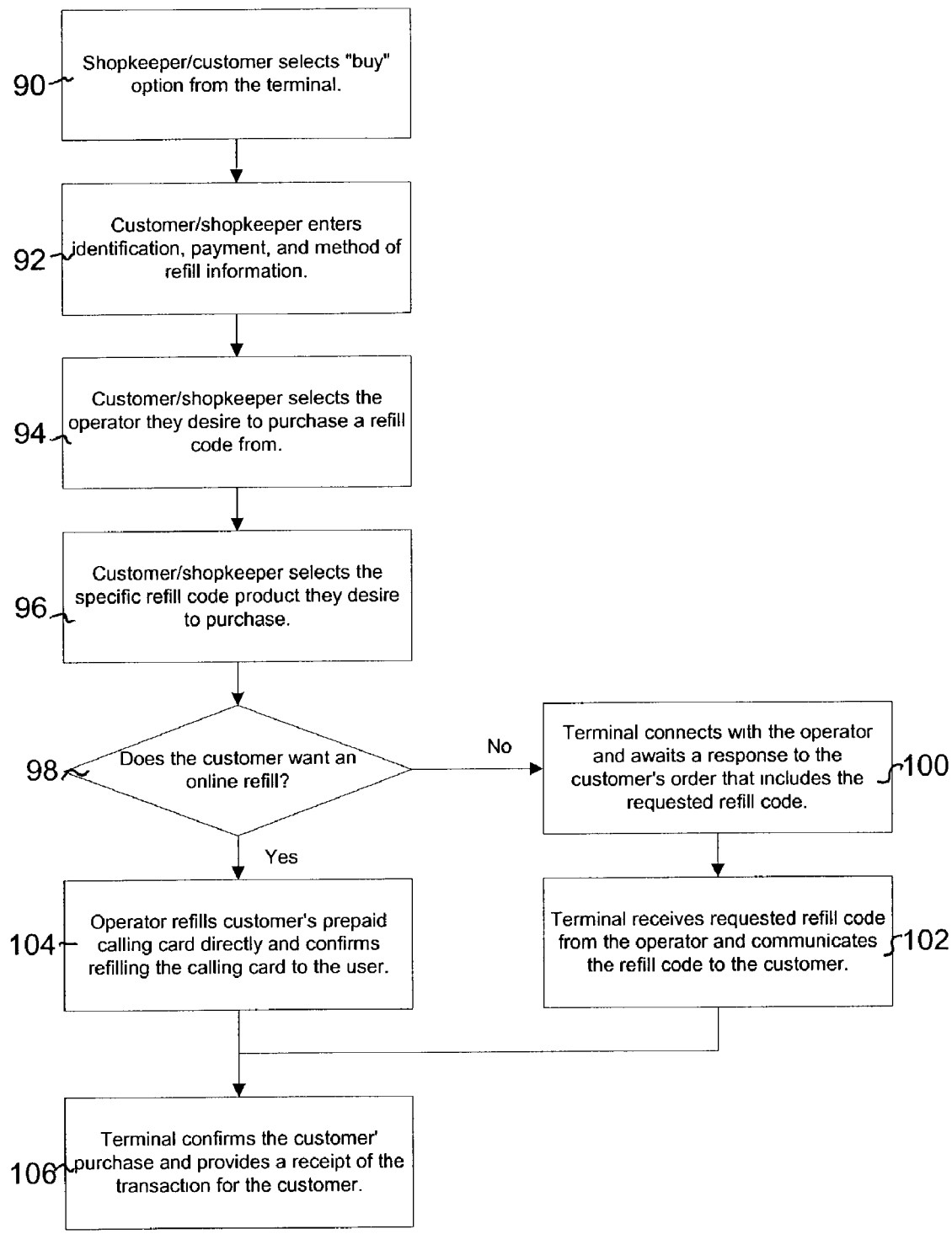
FIG. 5 is a flowchart of an exemplary refill code terminal purchase process in accordance with the present invention.

FIG. 5 shows a flowchart of an exemplary refill code terminal purchase process in accordance with the present invention, wherein an end user purchases a refill code from a partner via a refill terminal such as may be present at the partner's premises. The terminal refill process can be executed either by a terminal operator (e.g. cashier) who receives information from an end user and performs the purchase transaction for the end user, or directly by the end user using an "ATM" style terminal wherein the end user himself inputs his purchase information and receives the refill code. The terminal operator's authority to perform the refill transaction can be established by presenting authorization indicia, such as an electronically-readable card, to the terminal. Means are provided for withdrawing such authorization or for establishing such authorization (e.g. when the employee of the retailer resumes a work shift).

Referring now to FIG. 5, the terminal controller (e.g. cashier) or the end user first selects the "buy" option from those available options for the refill terminal to initiate a purchase (step 90). The end user then enters a payment method and one or more of their identification, and method of delivery information, and whether the refill is to occur online (step 92). This information may be entered by methods including manual entry, or automatic entry by reading a credit card or similar electronic or magnetic media that includes a tag that can be used to retrieve previously stored information. The end user then selects the operator they desire to purchase a refill code for (step 94), followed by the specific refill code product they desire to purchase (step 96).

The terminal then determines if the end user had requested an online refill (step 98). If not, then the terminal connects with the distributor, sends the end user's purchase order to the distributor, and awaits a response from the distributor that includes the requested refill code (step 100). After the purchase order goes through, the terminal communicates the refill code to the end user via a method which may include a printout of the refill code, e-mail or visual display (step 102). If the end user did request online refill, then the distributor directly refills the end user's prepaid calling card (step 104) and confirms the refill to the end user without sending the end user a refill code. The terminal may also provide a receipt of the transaction using the communication methods above that includes the refill code, terminal number, date and time of purchase, name of the product, refilling description, and instructions on how to refill (step 106).

The refill terminal may also have other functions available only to the terminal operator (retailer) including a report function that lists the purchase transaction statistics and profit data for a plurality of time periods, and a synchronization function that updates the terminal with the list of products and actual refill codes stored in the terminal. Thus, an update may automatically be performed to retrieve more recent product information, or to refill the terminal's buffer inventory of actual products (so that they can be instantly purchased by end users) when the inventory of a particular product has been depleted. The refill terminal may also include various security functions including locking and unlocking functions (keyed verification code, card swipe or both) that allow the terminal owner to disable or activate the terminal, respectively, in order to limit the times when the terminal can be used to purchase refill codes.

While the invention has been particularly shown and described with reference to preferred embodiments thereof, it will be understood by those skilled in the art that various changes in form and details may be made therein without departing from the spirit and scope of the invention

We claim:

1. A method for effecting delivery of a refill code by a distributor of refill codes to an end user of prepaid telecommunications services associated with a provider of said services, comprising the steps of:
    displaying refill code types, each refill code associated with one of a plurality of providers to an end user at a station, said station being linked to a computer network and having a visual display;
    receiving a refill code request from said end user;
    obtaining a refill code corresponding to said refill code request;
    reserving a refill code for said end user prior to securing payment from said end user;
    delivering said refill code to said end user by at least one of electronic mail, facsimile, short message system, visual display at said station, physical display on a printed medium, voice mail, and,
    transmitting said refill code to said provider in association of said refill code with said end user's telephone number for crediting said end user's telephone number;
    wherein said refill code information is displayed to said end user on a web site of a distributor and said web site of said distributor having one appearance of a plurality of appearances, said appearance is associated with a retailer and each of said plurality of appearance is associated with a different retailer.

2. The method as in claim 1, the step of obtaining a refill code further comprising: encrypting said refill code; and storing said encrypted refill code.

3. The method as in claim 1, the step of obtaining a refill code further comprising: obtaining said refill code from at least one of said distributor, an operator, a provider of telecommunication services, and a random number generator.

4. The method as in claim 1, the step of obtaining a refill code further comprising: obtaining said refill code from an inventory of refill codes maintained by said distributor.

5. The method as in claim 1, the step of delivering further comprising: delivering said refill code upon proof of payment therefor by said end user.

6. The method as in claim 1, wherein said refill code has been associated with said provider.

7. The method as in claim 1, additionally comprising the step of: delivering said refill code upon proof of payment therefor by said end user.

8. The method as in claim 1, additionally comprising the step of: delivering said refill code upon proof of payment therefor by said retailer.

9. The method as in claim 1, wherein payment for said refill code is effected by credit card.

10. The method as in claim 1, wherein payment for said refill code is made to said retailer or said distributor.

11. The method as in claim 1, wherein: said refill code information comprises a plurality of refill code types; and, said refill code request comprises selection of a refill code type.

12. The method as in claim 1, comprising prior to the step of delivering said refill code the steps of:
 receiving from said end user an address for delivery to said end user of a verification code;
 delivering said verification code to said address; and,
 receiving said verification code from said end user.

13. The method as in claim 1, wherein payment for said refill code is effected by funds transfer.

14. The method as in claim 1, wherein payment for said refill code is effected by charging an account authorized for use by said end user.

15. The method as in claim 14, wherein said account is associated with said retailer.

16. The method as in claim 1, wherein at least one of said end user and said retailer provides method of payment information to said distributor prior to delivery of said refill code.

17. The method as in claim 1, wherein said retailer receives a commission on the refill code delivered by said distributor.

18. The method as in claim 1, further comprising the step of tracking refill statistics for said end user.

19. A method for effecting delivery of a refill code by a distributor of refill codes to an end user of prepaid telecommunications services associated with a provider of said services, comprising the steps of
 displaying refill code types, each refill code associated with one of a plurality of providers to an end user at a station, said station being linked to a computer network and having a visual display;
 receiving a refill code request from said end user
 obtaining a refill code corresponding to said refill code request;
 delivering said refill code to said end user by at least one of electronic mail, facsimile, short message system, visual display at said station, physical display on a printed mediums, voice mails,
 transmitting said refill code to said provider in association of said refill code with said end user's telephone number for crediting said end user's telephone number; and
 receiving from said end user delivery information indicating how said refill code is to be delivered to said end user;
 wherein said refill code information is displayed to said end user on a web site of a distributor and said web site of said distributor having one appearance of a plurality of appearances, said appearance is associated with a retailer and each of said plurality of appearance is associated with a different retailer.

20. A system for effecting delivery of a refill code by a distributor of refill codes for resale to an end user of prepaid telecommunications services associated with a provider of said services, comprising:
 a refill code inventory containing available refill codes;
 an interface occupied by a set of refill code types, each refill code in inventory having been assigned a corresponding refill code type and having been associated with a provider;
 a processor receiving a refill code type request and obtaining an available refill code of said requested type from said inventory and upon delivery thereof designating said obtained refill code as an unavailable refill code;
 means for replenishing an end user's prepaid telecommunications services account with said obtained refill code upon receiving at least one of verification of said end user and said end user's telephone number;
 means for reserving a refill code for said end user prior to securing payment from said end user; and
 a database having a plurality of appearances and each of said plurality of appearance is associated with a different retailer and said appearance associated with said retailer is displayed to said end user when receiving said refill code.

21. The system as in claim 20, further comprising means for tracking refill statistics for said end user.

* * * * *